June 21, 1960    I. N. ELBLING ET AL    2,941,981
CURING AGENTS COMPRISING AMINE-POLYBORATE
ESTERS FOR EPOXY RESINS
Filed July 17, 1958

WITNESSES:

INVENTORS
Irving N. Elbling &
William R. Thomas.
BY
ATTORNEY

2,941,981
CURING AGENTS COMPRISING AMINE-POLYBORATE ESTERS FOR EPOXY RESINS

Irving N. Elbling and William R. Thomas, Pittsburgh, Pa., assignors to Westinghouse Electric Corporation, East Pittsburgh, Pa., a corporation of Pennsylvania Filed July 17, 1958, Ser. No. 749,287

8 Claims. (Cl. 260—47)

The present invention relates generally to curing catalysts for glycidyl polyethers, and specifically to amine-polyborate curing catalysts, to mixtures of glycidyl polyether resins and said catalysts, and to electrical components insulated and said cured glycidyl polyethers.

Glycidyl polyethers, also known as epoxy resins, have excellent chemical resistance, low moisture permeability and superior adhesive properties all of which make said resins particularly well suited for use as adhesive sealing compounds, casting resins, and surface coatings. Generally, glycidyl polyethers have been cured to produce hardened resins by heating the same in the presence of catalytic amounts of a hydrocarbon amine, an acid or an acid anhydride. Numerous disadvantages have resulted from such prior art curing practices.

The amine catalysts, such as diethylenetriamine and dimethylamine, are extremely fast acting catalysts when used in association with glycidyl polyethers. As a result, such resins must be used almost immediately after the catalyst has been admixed therewith. Any unused catalyzed resinous mixture must be discarded to prevent the same from hardening within the mixing container. Furthermore, many of the amines which have been used heretofore are toxic and cause dermatitis, and certain of them have quite unpleasant odors.

Of the acid anhydride materials which may be used, maleic anhydride and phthalic anhydride have enjoyed the widespread acceptance as curing catalysts for epoxy resins. Like the amine catalysts, however, the acid anhydrides when admixed with epoxy resins provide liquid mixtures having a relatively long shelf life but are very slow curing. A further disadvantage of acid anhydride catalysts lies in the fact that they must be admixed with the resins at elevated temperatures to insure complete solution therein. On subsequent cooling, however, precipitation of the catalytic material frequently occurs.

An object of the present invention is to provide mixtures of epoxy resin and epoxy-novolak resins, and curing catalyst, said curing catalyst comprising a composition of (1) at least one compound selected from the group consisting of organic amines and metal amine chelates and (2) a polyborate ester, said catalytic mixtures being stable for prolonged periods at room temperature and being readily reactable at elevated temperatures to provide cured resinous products.

Another object of the present invention is to provide a curing catalyst for epoxy resins and epoxy-novolak resins comprised of an admixture of (1) at least one compound selected from the group consisting of organic amines and metal amine chelates and (2) a polyborate ester.

A still further object of this invention is to provide electrical members insulated with a resinous composition comprising a hardened product derived by heating the reaction product of (A) an epihalohydrogen and a compound selected from the group consisting of dihydric phenol and the condensation product of an aldehyde and a mononuclear monohydrin alkyl phenol and (B) a polyborate ester and at least one compound selected from the group consisting of organic amines and metallic amine chelates.

Other objects of the invention will, in part, be obvious and will, in part, appear hereinafter.

For a better understanding of the nature and objects of the invention, reference should be had to the following detailed description and drawing, in which.

In accordance with the present invention and in attainment of the foregoing objects, there is provided a curing catalyst for glycidyl polyether resins and glycidyl polyether-novolak resins, said catalyst comprising an admixture of (a) from 1 to 2 mols of at least one polyborate ester having a formula selected from the group consisting of:

wherein the valence bonds at each end are satisfied by at least one radical selected from the group consisting of a bivalent R radical and a monovalent R' radical, wherein R is selected from the group consisting of polyhydric alcohols having two hydroxyl groups removed, and R' is selected from the group consisting of monohydric and polyhydric alcohols having one hydroxyl group removed, and (b) from 1 to 3 mols of at least one compound selected from the group consisting of organic amines selected from the group consisting of primary, secondary and tertiary amines and metallic amine chelates having the general formula:

Epoxy and epoxy-novolak resins can be cured by admixing the same with from 2% to 25% by weight, based on the weight of resin, of the catalyst described herein.

In accordance with still another aspect of the present invention there is provided an electrical member comprising an electrical conductor and electrical apparatus insulated with a hardened composition comprising either an epoxy resin or epoxy-novolak resin and cured with the catalyst described herein.

In preparing the catalyst very satisfactory results have been achieved when the metal amine chelate or organic amine introduces atoms of nitrogen in excess of the atoms of boron from the polyborate ester, up to a 4 to 1 ratio. Especially good results have been achieved when the organic amine or metallic amine chelate and borate esters are combined in such a ratio as to provide one atom of nitrogen per atom of boron in the finished catalyst. This ratio is not critical however, and satisfactory results have been achieved with a ratio of one nitrogen to two boron.

Mixtures of glycidyl polyethers and glycidyl polyether-novolak in combination with the curing agents of this invention have extremely long shelf life at room temperatures. Thus, such mixtures do not gel even after several months storage at room temperature (20° C.–30° C.) yet will cure to the solid state after only a few hours heating at 135° C. or after having been heated to a temperature of 200° C. for a period of about one hour.

A further advantage of this invention resides in the fact that the curing catalyst is a liquid which is easy to dissolve in the glycidyl polyether or glycidyl polyether-novolak. In many cases, the curing catalyst, since it is a liquid, helps reduce the viscosity of the glycidyl polyethers thereby permitting more complete penetration and impregnation of electrical apparatus to which the resin-catalyst mixture may be applied.

The resinous epoxy compositions which may be cured using the catalyst of this invention may be prepared, in accordance with one preferred procedure, by reacting predetermined amounts of at least one polyhydric phenol or polyhydric alcohol and at least one epihalohydrin in an alkaline medium. Phenols which are suitable for use in preparing such resinous polymeric epoxides include those which contain at least two phenolic hydroxide groups per molecule. Polynuclear phenols which have been found to be particularly suitable include those wherein the phenol nuclei are joined by carbon bridges, such for example as 4,4'-dihydroxy-diphenyl-dimethyl-methane (referred to hereinafter as bis-phenol "A"), 4,4'-dihydroxy-diphenyl-methyl-methane and 4,4'-dihydroxy-diphenyl-methane (referred to hereinafter as bis-phenol "F"). In admixture with the named polynuclear phenols, use also may be made of those polynuclear phenols wherein the phenolic nuclei are joined by sulfur bridges, such for example as 4,4'-dihydroxy-diphenyl-sulfone. Polyhydric alcohols are glycerol, glycol, propylene glycol and 1,5-pentanediol.

While it is preferred to use epichlorohydrin as the epihalohydrin in the preparation of the resinous polymeric epoxide starting material of the present invention, homologues thereof, for example, epibromohydrin and the like also may be used advantageously.

In the preparation of the resinous polymeric epoxides, aqueous alkali is employed to combine with the halogen of the epichlorohydrin reactant. The amount of alkali employed should be substantially equivalent to the amount of halogen present and preferably should be employed in an amount somewhat in excess thereof. Aqueous mixtures of alkali metal hydroxides, such as potassium hydroxide and lithium hydroxide may be employed although it is preferred to use sodium hydroxide since it is relatively inexpensive.

The product of the reaction, instead of being a single simple compound, is generally a complex mixture of glycidyl polyethers, but the principal product may be represented by the formula:

wherein $n$ is an integer of the series 0, 1, 2, 3, and R represents the divalent hydrocarbon radical of the dihydric phenol. While for any single molecule of the polyether $n$ is an integer, the fact that the obtained polyether is a mixture of compounds causes the determined value for $n$, from molecular weight measurement, to be an average which is not necessarily zero or a whole number. Although the polyether is a substance primarily of the above formula, it may contain some material with one or both of the terminal glycidyl radicals in hydrated form.

The simplest polyether is a diglycidyl diether of the dihydric phenol which contains a single divalent aromatic hydrocarbon radical from the dihydric phenol and has two glycidyl radicals linked thereto by ethereal oxygen atoms. More generally, the polyether is of more complex character and contains two or more aromatic hydrocarbon radicals alternating with glyceryl groups in a chain which are linked together by intervening ethereal oxygen atoms.

The resinous polymeric epoxide, or glycidyl polyether of a dihydric phenol suitable for use in this invention has a 1,2-epoxy equivalency greater than 1.0. By epoxy equivalency reference is made to the average number of 1,2-epoxide groups:

contained in the average molecule of the glycidyl ether. Owing to the method of preparation of the glycidyl polyethers and the fact that they are ordinarily a mixture of chemical compounds having somewhat different molecular weights and contain some compounds wherein the terminal glycidyl radicals are in hydrated form, the epoxy equivalency of the product is not necessarily the integer 2.0. However, in all cases, it is a value greater than 1.0. The 1,2-epoxy equivalency of the polyethers is thus a value between 1.0 and 2.0.

The 1,2-epoxy value of the glycidyl polyether is determined by heating a weighted sample of the ether with an excess of 0.2 N pyridinium chloride in chloroform solution at the boiling point under reflux for two hours whereby the pyridinium chloride hydrochlorinates the epoxy groups to the chlorohydrin groups. After cooling, the excess pyridinium chloride is back-titrated with 0.1 N sodium hydroxide in methanol to the phenolphthalein end point.

Resinous polymeric epoxides or glycidyl polyethers suitable for use in accordance with this invention may be prepared by admixing and reacting from one to ten mol proportions of an epihalohydrin, preferably epichlorohydrin, with from one to three mol proportions of bis-phenol "A" in the presence of at least a stoichiometric excess of alkali based on the amount of halogen.

To prepare the resinous polymeric epoxides, aqueous alkali, bis-phenol "A" and epichlorohydrin are introduced into and admixed in a reaction vessel. The aqueous alkali serves to dissolve the bis-phenol "A" with the formation of the alkali salts thereof. If desired, the aqueous alkali and bis-phenol "A" may be admixed and the epichlorohydrin added thereto, or an aqueous solution of alkali and bis-phenol "A" may be added to the epichlorohydrin. In any case, the mixture is heated in the vessel to a temperature within the range of about 80° C. to 110° C. for a period of time varying from about one-half hour to three hours, or more, depending on the quantity of reactants used.

Upon completion of heating, the reaction mixture separates into layers. The upper aqueous layer is withdrawn and discarded, and the lower layer, containing the desired epoxy, is washed with hot water to remove unreacted alkali and halogen salts, in this case, sodium chloride. If desired, dilute acids, for example, acetic acid or hydrochloric acid, may be employed during the washing procedure to neutralize the excess alkali.

The glycidyl polyether-novolak resins suitable for combining with and for curing by the catalysts in accordance with this invention are prepared by condensing an epihalohydrin with a novolak resin of an aldehyde and a monohydric mononuclear alkyl phenol containing at least four carbon atoms in the alkyl group, which novolak resin contains about three to twelve phenolic hydroxyl groups per average molecule. The term "novolak" as used herein refers to fusible phenol-aldehyde resins prepared by reacting at least one phenol with at least one aldehyde in the ratio of 1 mol phenol to from about 0.5 to 0.85 mol of aldehyde using an acidic catalyst. The condensation is effected by mixing the novolak resin with at least 3 mols of an epihalohydrin such as epichlorohydrin per phenolic hydroxyl equivalent of novolak resin and with addition of about 1 mol of alkali metal hydroxide per phenolic hydroxyl equivalent of novolak resin. The reaction mixture is maintained within the range of about 60° C. to 150° C. during the ensuing reaction. Upon completion of the reaction, the formed alkali metal salt and any unreacted hydroxide are removed from the resulting epoxy-novolak resin as are also unreacted epichlorohydrin and water, the resultant epoxy-novolak, in the form of a viscous liquid or solid, is separated from the reaction mixture and may be purified, if required. The resultant resin generally will be used in solvent solution.

Although novolak resins from formaldehyde are generally preferred for use in this invention, novolak resins from any other aldehydes such as, for example, acetaldehyde, chloraldehyde, butyraldehyde, furfuraldehyde, can also be used. In order that the epoxy-novolak resin will have the desired degree of solubility in organic solvents such as paraffinic hydrocarbons, it is essential that the novolak resin be derived from an alkyl phenol containing from 4 to 18 carbon atoms in the alkyl group. Although the alkyl group can be straight chained, it is generally preferred to have novolak resin of a phenol containing a branch chain alkyl substitutent. Among representative alkyl phenols from which the novolak resin may be derived for use in preparing the epoxy-novolak resin are butylphenol, tertiary butylphenol, tertiary amylphenol, hexylphenol, 2-ethylhexylphenol, diisobutylphenol, nonylphenol, isononylphenol, decylphenol, dodecylphenol, isododecylphenol, 3-pentadecylphenol, and the like. It is preferred, but not essential, that the alkyl substituent be linked to the para-carbon atom of the parent phenolic nucleus. For use in preparing the epoxy-novolaks of this invention, a novolak resin of a substance of the group consisting of p-alkyl phenol, o-alkyl phenol and mixtures thereof is suitable when the alkyl group contains at least four carbon atoms.

The epoxy-novolak resin is formed by adding the novolak resin to the epichlorohydrin and then adding an alkali metal hydroxide to the mixture so as to effect the desired condensation reaction. About 1 mol of alkali metal hydroxide such as sodium or potassium hydroxide is used per one phenolic hydroxyl equivalent of the novolak resin. The amount of alkali metal hydroxide need not be exactly 1 mol per equivalent of novolak resin although, in general, it is preferred that any variation be toward an excess such as use of 1.02, 1.05, or 1.1 mols of hydroxide per equivalent of novolak resin. The alkali metal hydroxide may be added continuously or intermittently during the course of the reaction. The addition of solid alkali metal hydroxide in the form of pellets or flakes is convenient. The rate of addition is desirably effected gradually so as to avoid having the reaction mixture become too strongly basic or acidic. During the reaction, the reaction mixture is heated or cooled so that the temperature is maintained within the range of about 60° C. to 150° C. Heat is helpful in getting the reaction under way, but since the reaction is quite exothermic, cooling is generally required after initiation. It is convenient to effect the reaction in a vessel equipped with heating means and a reflux condenser. After the reaction is under way, the reaction mixture boils with heat removal and temperature control being effected by the refluxing of epichlorohydrin and formed water. The reaction is preferably effected at a temperature of about 75° C. to 110° C. and is usually conducted at about 95° C. to 100° C.

Although water is one of the products of the condensation reaction, it is useful to add a small quantity to the initial mixture of reactants. For this purpose, water in an amount of about 0.1% to 2% by weight of the sum of the weights of the epichlorohydrin and the novolak resin is suitable.

Upon completion of the condensation reaction of the epichlorohydrin with the novolak resin and the alkali metal hydroxide, the formed epoxy-novolak resin is separated from the reaction mixture. The separation involves removal from the epoxy-novolak resin from the unreacted excess epichlorohydrin, formed water, alkali metal chloride and any excess alkali metal hydroxide. It is convenient to first distill epichlorohydrin and water from the mixture. The residue is then dissolved in a solvent for the epoxy-novolak resin, but a non-solvent for the alkali metal chloride such as a liquid distilled hydrocarbon, for example, benzene, toluene, xylene, hexane, heptane, octane, or petroleum naphtha, the solvent being used in an amount of about one-half or twice the weight of epoxy-novolak resin. This causes the alkali metal chloride to precipitate from the solution. The salt is filtered or centrifuged from the mixture. The filtrate may next be washed with water to insure removal of inorganic and any other water soluble impurities although this operation is not essential. The solvent is removed from the filtrate by distillation, preferably under sub-atmospheric pressure such as down to a pressure of 1 to 10 millimeters Hg.

The obtained epoxy-novolak resins may vary from very viscous liquids to solids at normal temperatures (20° C.). Even the normal solid resins are fusible. The resins have a very complicated chemical structure. Analysis indicates that the majority such as about 60 to 90 or more percent of the hydrogen atoms of the phenolic hydroxyl group of the original novolak resin are replaced by glycidyl radicals. The epoxy-novolak resins also contain an appreciable proportion of alcoholic hydroxyl groups which are largely present in 2,3-dihydroxypropyl radicals that have replaced hydrogen atoms of phenolic hydroxyl groups of the original novolak resin. A small proportion of chlorine is contained in the resin, some of which is present in 3-chloro-2-hydroxy propyl groups and some in more complicated groups which are 3-chloro-2-(3-chloro-2-hydroxypropyloxy)propyl and 3-chloro-2-(2,3-epoxypropyloxy)propyl radicals linked to the phenolic ether oxygen atoms in the epoxy resin. The product may contain an insignificant amount of phenolic hydroxyl groups, i.e., at most, less than about .3 per average molecule.

Organic amines which may form a portion of the curing catalyst of this invention may comprise primary, secondary and tertiary amines and mixtures thereof, for example, monoethanolamine, piperidine, diethanolamine, triethanolamine, ethylenediamine, diethylenetriamine, triethyleneamine, dimethylaminopropylamine, diethylaminopropylamine, pyrrolidine, and the like. The preparation of these amines are well known in the art and it is not believed necessary that a description of their preparation be included herein.

The metallic amine chelates which may form a portion of the curing catalyst of this invention may be prepared by initially reacting one mole of a metal ester, having the general formula $M(OR)_4$ with two mols of triethanolamine and distilling off two mols of the low boiling alcohol, ROH. Suitable metallic amine chelates which may be used in accord with this invention include titanium amine chelate, aluminum amine chelate and silicon amine chelate. Particularly satisfactory results have been achieved when the metal amine chelate of this invention is titanium amine chelate. This titanium amine chelate is a chelating agent well known in the art and may be represented by the following structural formula:

wherein R and R' may be aliphatic groups, aromatic groups or mixtures thereof.

The polyborate esters forming a portion of the curing catalyst of this invention are well known in the art and include those materials having the following structural formulae:

where the valence bonds at each end are satisfied by at least one radical selected from the group consisting of a bivalent R radical and a monovalent R' radical wherein R is a polyhydric alcohol and R' may be a mono or polyhydric alcohol. The polyhydric alcohols are selected from the group consisting of saturated aliphatic alcohols having from 2 to 6 OH groups per molecule, and the monohydric alcohols are selected from the group consisting of saturated and unsaturated aliphatic, aromatic or phenolic hydroxyl alcohols having at least one carbon atom per molecule. By the use of the term polyborate esters are meant compounds which contain two or more boron atoms.

While the teaching of this invention is applicable to polyborates in general, particularly satisfactory results have been achieved by using a polyborate ester having the formula shown below:

that is, trihexylene glycol biborate. Equally satisfactory results have been obtained using the following polyborates:

that is, tri(octylene glycol) biborate; and that is, hexylene glycol biborate.

The polyborate ester and metallic amine chelate or organic amine, will dissolve readily in liquid glycidyl polyethers and epoxy-novolaks to form homogeneous compositions. The resultant mixture may be stored for several months at room temperature without any appreciable increase in viscosity. Solid epoxy resins and epoxy-novolak resins generally are dissolved in a solvent before the herein described liquid catalyst is added. It is a particularly important feature of this invention that when the catalyzed polyether mixture is subjected to elevated temperatures of from 60° C. to 200° C., and higher, the liquid glycidyl polyether-catalyst mixture readily reacts to form a hard, tough, cured resinous product. Such products exhibit low electrical losses over substantially all temperatures at which such apparatus operates.

Glycidyl polyethers and glycidyl polyether-novolaks catalyzed with the curing catalyst mixture of this invention are particularly suitable for electrical insulating applications. Thus, solutions of the glycdyl polyethers and glycidyl polyether-novolak and curing catalysts may be applied to electrical wires, cables, coils, windings and the like, as potting, impregnating and coating resins and varnishes. Upon being subjected to heat, any solvent which may be present in the polyether or polyether-novolak curing catalyst mixture evaporates and the liquid polyether or polyether-novolak cures to a hard, tough resinous mass. These catalyzed glycidyl polyether and glycidyl polyether-novolak commpositions also may be employed for potting and casting applications. Laminated magnetic cores, for example, may be dipped in such liquid compositions, using vacuum and pressure if necessary, and the composition will readily fill all the spaces between laminates. On heating, the composition between the laminations cures to a hard, tough, adhesive binder holding the laminations in position to produce a solid core which is extremely resistant to delamination and may be cut into core segments without rupture. Electrical transformers, rectifiers and electronic components of various kinds may be potted or cast within the completely reactive catalyzed glycidyl polyether compositions of this invention.

The compositions comprising the epoxy resins and/or the epoxy resin-novolaks in combination with the herein described curing catalyst provide excellent adhesive compositions. Thin coatings may be applied to metal, wood, porcelain, paper, plastics such as phenolic laminates, and when the coated surfaces are superimposed under moderate pressure and heated at temperatures of from 60° C. to 200° C. and higher, unusually good bonds are obtained. Steel plates cemented with these compositions and cured at 150° C. for two hours require approximately 17,000 pounds on an area of 5.25 square inches in shear to rupture the bond.

Glycidyl polyethers and glycidyl polyether-novolaks which are cured using the catalytic mixtures of this invention may be admixed with solids, such as silica, titanium dioxide, glass fibers, wood flour, mica, graphite and calcium silicate. In some instances small amounts up to 50% of the weight of the composition of other resins, such as phenolics, polyesters such as glycol maleates, and alkyd resins, may be admixed with the glycidyl polyethers and glycidyl polyether-novolaks in the practice of this invention.

The catalyst of this invention is prepared by admixing at least one compound selected from the group consisting of organic amines and metallic amine chelates with at least one polyborate ester.

More specifically, it has been found that a catalyst suitable for use in accord with this invention may be prepared by admixing from 1 to 3 mols of an organic amine, for example, monoethanolamine, diethanolamine and triethanolamine, with from 1 to 2 mols of a polyborate ester, for example, trihexylene glycol biborate or tri-(octylene glycol) biborate. While an attempt has been made to define the reactants in terms of mols, the important factor is that best results are achieved when the organic amine or metal amine chelate introduce atoms of nitrogen in excess of the atoms of boron. A ratio of four nitrogen atoms to one boron atom has been found to give satisfactory results.

When the catalyst is formed by the combination of organic amines and a polyborate ester it is only necessary to cold blend the two reactants together with agitation.

The catalyst of this invention may also be prepared by combining from 1 to 3 mols of at least one metal amine chelate with from 1 to 2 mols of a polyborate ester.

When it is desired to prepare a catalyst of this invention by combining the metal amine chelate and the polyborate ester, the two components are admixed and heated for a period of 3–4 hours at a temperature of approximately 90–115° C. This reaction drives off alcohol by-products which would be liberated during the heat-curing of the resin and cause the formation or undesirable air bubbles or blisters in the surface of the resin.

It will be understood, of course, that more than one amine can be admixed to form the amine constituent of the catalyst and that more than one metal amine chelate can be combined to form the metal amine chelate constituent of this catalyst. It will also be understood that an amine and a metallic amine chelate can be combined and then admixed and heated with the polyborate ester to form the catalyst of this invention.

Particularly satisfactory results have been achieved in this invention when 1 mol of triethanolamine titanate and 1 mol of trihexylene glycol biborate have been combined to form the catalyst of this invention. Satisfactory results have also been achieved when two mols of triethanolamine titanate and one mol of trihexylene glycol biborate have been combined to form the catalyst of this invention. A still third and most satisfactory catalyst has been formed by the combination of 3 mols of triethanolamine titanate and 2 mols of trihexylene glycol biborate to form the catalyst of this invention.

Satisfactory catalysts for use in accord with this invention also have been prepared by admixing 2 mols of triethanolamine and 1 mol of trihexylene glycol biborate; satisfactory results have also been achieved in preparing the catalyst of this invention by admixing 2 mols of piperidine with 1 mol of trihexylene glycol biborate.

The catalyst prepared as described above is then cold blended with the glycidyl polyether or glycidyl polyether-novolak resin in such quantity as to constitute 2% to 25% by weight, based on the weight of the glycidyl polyether resin or the glycidyl polyether-novolak resin. If the glycidyl polyether resin or glycidyl polyether-novolak resin is a liquid, it is necessary only to admix the two physically. If, however, the epoxy resin or epoxy-novolak resin is a solid, one or two procedures may be followed in admixing the catalyst with the resin. One procedure is to heat the epoxy above its melting point and then admix the catalyst therein, or in the alternative, the resin may be dissolved in a suitable solvent for instance glycol monoethyl ether, methylisobutylketone, toluene and the catalyst admixed therewith.

In order to indicate more specifically the advantages and capabilities of the curing catalytic mixture of the present invention, the following specific examples are set forth. The parts given are by weight unless otherwise indicated.

*Example I*

A liquid glycidyl polyether is prepared by introducing into a reaction vessel equipped with agitator, cooling and heating means, distillation condenser and receiver, 513 parts (2.25 mols) of bis-phenol "A" and 2081 parts (22.5 mols) of epichlorohydrin and 10.4 parts of water. A total of 188 parts of 97.5% sodium hydroxide, corresponding to 2.04 mols (2% excess) per mol of epichlorohydrin, is added in increments over several hours. The temperature in the vessel does not rise above 100° C. and is generally not above 95° C. After all the sodium hydroxide is added, the excess water and epichlorohydrin are removed by evacuating to an absolute pressure of 50 mm. of mercury at 150° C. The vessel is then cooled to 90° C. and 36 parts of benzene added, and then cooled further to 40° C. with salt precipitating from the solution. The solution is filtered to remove the salt, the salt being washed with 36 additional parts of benzene, the benzene washing out any polyether resin, and then adding to the filtrate and both returned to the vessel. The benzene is then distilled off, the polyether resin being heated at an increasing temperature until at 125° C., vacuum is applied and distillation is continued until the vessel contents are at 170° C. at 25 mm. of mercury absolute pressure. The glycidyl polyether had a viscosity of Z–3 on the Gardner-Holdt scale.

*Example II*

This example illustrates the preparation of an epoxy-novolak resin in which the novolak was a condensate of paratertiary butylphenol and formaldehyde. 328 parts of the novolak resin was dissolved in 920 parts of epichlorohydrin and 5 parts of water. Small pellets of sodium hydroxide in an amount of 82 parts were divided into six portions of approximately equal weight. The first portion was added to the entire solution with stirring and the mixture was heated rapidly to about 80° C. Heating was then discontinued and the heat of reaction carried the temperature up to about 100° C. At ten-minute intervals, the remaining portions of sodium hydroxide were added while keeping the temperature at about 95° C. to 100° C. After addition of all the sodium hydroxide, the mixture was stirred and refluxed for one hour. The epichlorohydrin and water were then distilled off at atmospheric pressure to a kettle temperature of about 130° C. While still warming about 450 parts of benzene were added to the mixture and the precipitated sodium chloride was removed by filtration. The benzene was distilled off under vacuum up to a temperature of about 140° C. under a pressure of about 4 mm. of mercury, leaving 398 parts of epoxy-novolak resin. Equally satisfactory results may be obtained by substituting epibromohydrin for epichlorohydrin in preparing the epoxy-novolak of Example II.

*Example III*

A solid glycidyl polyether was prepared in accordance with the procedure described in Example I except there was used 1.4 parts epichlorohydrin and 1 part bis-phenol "A."

Example IV

A solid glycidyl polyether was prepared in accordance with the procedure described in Example I except there was used 1.22 parts epichlorohydrin and 1 part bis-phenol "A."

Example V

A liquid glycidyl polyether was prepared by cold blending 20 parts of butyl-glycidyl ether with 80 parts of the resin of Example I.

Example VI

A liquid glycidyl polyether was prepared in accordance with the procedure described in Example I except there was used 5 parts of epichlorohydrin and 1 part bis-phenol "A."

Example VII

A liquid glycidyl polyether was prepared in accordance with the procedure described in Example I except there was used 2.04 parts epichlorohydrin and 1 part bis-phenol "A."

Example VIII

A catalyst may be prepared in accordance with this invention by charging two mols of triethanolamine and 1 mol of trihexylene glycol biborate into a reaction vessel and cold blending the same by agitating for approximately 30 minutes.

Example IX

Two mols of piperidine and 1 mol of trihexylene glycol biborate were charged into a suitable vessel and cold blended by rapid agitation for a period of approximately 30 minutes.

Example X

One mol of triethanolamine titanate and 1 mol of trihexylene glycol biborate were charged into a suitable vessel and heated at a temperature in the range of 90° C. to 135° C. for a period of approximately 3–4 hours.

The reaction product is a clear, yellow fluid, suitable for use in curing glycidyl polyether resins or glycidyl polyether-novolak resins in accordance with the teaching of this invention.

Example XI

Two mols of triethanolamine titanate and 1 mol of trihexylene glycol biborate were charged into a suitable vessel and heated at a temperature in the range of 100° C. to 135° C. for a period of approximately 3–4 hours.

The reaction product is a clear yellow, slightly viscous liquid suitable for use in curing glycidyl polyether resins or glycidyl polyether-novolak resins in accordance with the teaching of this invention.

Example XII

Three mols of triethanolamine titanate and 2 mols of trihexylene glycol biborate were charged into a suitable vessel and heated at a temperature in the range of 100° C. to 135° C. for a period of approximately 3–4 hours.

The reaction product is a clear, slightly yellow liquid suitable for use in curing glycidyl polyether resins and glycidyl polyether-novolak resins in accordance with the teaching of this invention.

Example XIII

One mol of triethanolamine and 1 mol of trihexylene glycol biborate were charged into a suitable reaction vessel and cold blended by agitating for approximately 30 minutes.

The resultant admixture was suitable for use in curing resins in accordance with this invention.

Example XIV

One mol of monoethanolamine and 2 mols of trihexylene glycol biborate were changed into a reaction vessel and cold blended by agitating for approximately 30 minutes.

The resultant admixture was suitable for use in curing resins in accordance with this invention.

Example XV

One mol of monoethanolamine and 1 mol of trihexylene glycol biborate were charged into a reaction vessel and cold blended by agitating for approximately 30 minutes.

The resultant product was suitable for use in curing resins in accordance with this invention.

Example XVI

Three mols of monoethanolamine and 2 mols of trihexylene glycol biborate were charged into a reaction vessel and cold blended by agitating for approximately 30 minutes.

The resultant product was suitable for use in accordance with this invention.

Example XVII

One mol of triethanolamine and 2 mols of trihexylene glycol biborate were charged into a suitable reaction vessel and cold blended by agitating for approximately 30 minutes.

The resultant product was suitable for use in accordance with this invention.

Example XVIII

Two mols of triethanolamine and 3 mols of trihexylene glycol biborate were charged into a suitable reaction vessel and cold blended by agitating for approximately 30 minutes.

The resultant product was suitable for use in accordance with this invention.

Example XIX

Three mols of piperidine and 1 mol of trihexylene glycol biborate were charged into a suitable reaction vessel and cold blended by agitating for approximately 30 minutes.

The resultant product was suitable for use in accordance with this invention.

Example XX

A mixture of 100 parts of the glycidyl polyether of Example I were admixed with 15 parts of the catalyst of Example XII. The resultant mixture gelled in 1.25 hours at a temperature of 150° C., 1.5 hours at a temperature of 135° C., and in 6 hours at 105° C.

After being heated for 24 hours at a temperature of 135° C., the electrical properties of the cured resin were as follows:

| Test Temp. | 100×tan α | | Dielectric Constant | |
|---|---|---|---|---|
| | 60 Cy. | 1 Kc. | 60 Cy. | 1 Kc. |
| 25° C. | 0.25 | 0.35 | 3.52 | 3.49 |
| 100° C. | 1.39 | 2.70 | 3.80 | 3.71 |
| 150° C. | 6.51 | 3.40 | 4.86 | 4.61 |

Example XXI

A mixture of 100 parts of the glycidyl polyether of Example VI were admixed with 10 parts of the additive of Example XII. The resultant mixture gelled in 1.00 hour at a temperature of 150° C., 1.75 hours at a temperature of 135° C., and in 5.75 hours at 105° C.

After being heated for 24 hours at a temperature of

135° C., the electrical properties of the cured resin were as follows:

| Test Temp. | 100×tan α | | Dielectric Constant | |
|---|---|---|---|---|
| | 60 Cy. | 1 Kc. | 60 Cy. | 1 Kc. |
| 25° C | 0.23 | 0.37 | 3.57 | 3.56 |
| 101° C | 0.50 | 0.35 | 3.67 | 3.63 |
| 152° C | 6.24 | 3.42 | 4.65 | 4.38 |

Example XXII

A mixture of 100 parts of the glycidyl polyether of Example V were admixed with 15 parts of the additive of Example XII. The resultant mixture gelled in 2.75 hours at a temperature of 150° C., 2.50 hours at a temperature of 135° C., and in 16.0 hours at 100° C.

After being heated for 24 hours at a temperature of 135° C., the electrical properties of the cured resin were as follows:

| Test Temp. | 100×tan α | | Dielectric Constant | |
|---|---|---|---|---|
| | 60 Cy. | 1 Kc. | 60 Cy. | 1 Kc. |
| 25° C | 2.82 | 1.95 | 4.40 | 4.20 |
| 100° C | 70.8 | 7.98 | 6.77 | 5.92 |
| 150° C | 92.3 | 7.58 | 6.31 | 5.11 |

Example XXIII

A mixture of 100 parts of the glycidyl polyether of Example VII were admixed with 10 parts of the additive of Example XI. The resultant mixture gelled in 0.75 hour at a temperature of 150° C., and in 2.25 hours at 135° C.

After being heated for 24 hours at a temperature of 135° C., the electrical properties of the cured resin were as follows:

| Test Temp. | 100×tan α | | Dielectric Constant | |
|---|---|---|---|---|
| | 60 Cy. | 1 Kc. | 60 Cy. | 1 Kc. |
| 25° C | .33 | 0.47 | 3.89 | 3.86 |
| 100° C | 23.6 | 8.02 | 6.22 | 5.31 |
| 150° C | Very high | 200 | | 11.02 |

The catalyzed resin was heated for an additional 24 hours at 135° C., and the electrical properties were improved as illustrated below:

| Test Temp. | 100×tan α | | Dielectric Constant | |
|---|---|---|---|---|
| | 60 Cy. | 1 Kc. | 60 Cy. | 1 Kc. |
| 25° C | 0.29 | 0.38 | 3.84 | 3.81 |
| 100° C | 16.7 | 6.66 | 5.67 | 4.95 |
| 150° C | | 149.0 | | 8.03 |

Example XXIV 100 parts of the glycidyl polyether of Example III was dissolved in toluene and the resultant solution admixed with 10 parts of the catalyst of Example XII. The resultant mixture gelled in 3.0 hours at a temperature of 100° C., and in 1.5 hours at a temperature of 135° C. and in 1.0 hour at 150° C.

Example XXV 100 parts of the epoxy-novolak of Example II was admixed with 10 parts of the catalyst of Example XII. The resultant mixture gelled in 5.0 hours at a temperature of 100° C., 1.75 hours at a temperature of 135° C., and in 1.25 hours at 150° C.

After being heated for 24 hours at a temperature of 135° C., the electrical properties of the cured resin were as follows:

| Test Temp. | 100×tan α | | Dielectric Constant | |
|---|---|---|---|---|
| | 60 Cy. | 1 Kc. | 60 Cy. | 1 Kc. |
| 25° C | 0.30 | 0.31 | 3.76 | 3.72 |
| 100° C | 4.04 | 4.34 | 5.58 | 5.20 |
| 150° C | 31.72 | 3.45 | 5.86 | 5.26 |

Equally satisfactory results were obtained by admixing the additives of Examples VIII through X and Examples XIII through XIX with the resins of Examples I through VII with the resultant mixture containing from 2% to 25%, by weight, based on the weight of resin of the catalyst of this invention.

Figure 1:
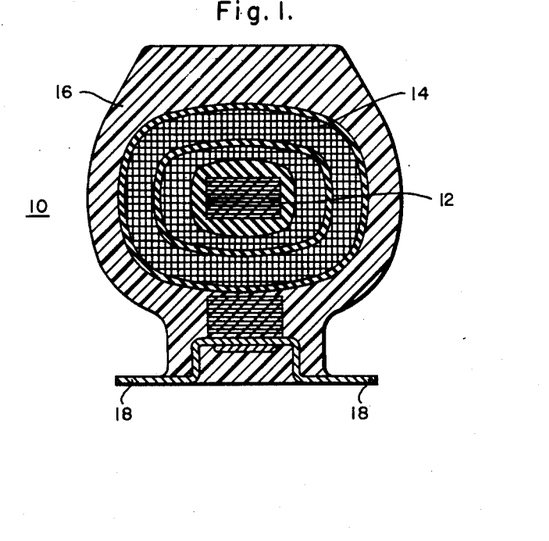
Figure 1 is a side view in cross section of an electrical transformer insulated with a resin cured with the catalysts of this invention.

Referring to the drawing, in Fig. 1 there is illustrated a transformer 10 comprising a core 12 comprised of any suitable metal, for example, steel, a coil 14 comprised of a suitable metal wire, for example copper, silver, aluminum and the like, and a resinous insulation 16 comprised of a heat-hardened glycidyl polyether resin cured by heating in the presence of the catalyst of this invention. Connections are made to the transformer through metal contacts 18 which pass from the coil 14, through the resinous insulator 16.

Figure 2:
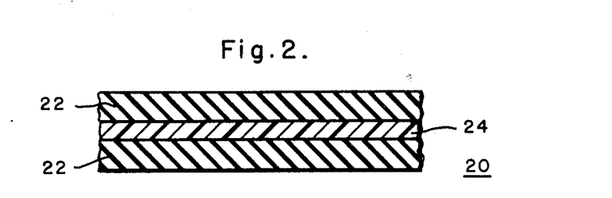
Fig. 2 is a cross-sectional view of a laminate formed by bonding together two sheets of a suitable material by an adhesive comprised of a resin cured with the catalysts of this invention.

Referring to Fig. 2, there is illustrated a laminated article of manufacture 20 comprised of two sheets of electrical insulating material 22, for example, kraft paper bonded together by a layer of adhesive 24 comprised of the catalyzed glycidyl polyether resin of this invention.

While the present invention has been described with reference to particular embodiments thereof, it will be understood, of course, that certain changes, modifications and substitutions may be made therein without departing from its scope.

We claim as our invention:

1. A composition of matter comprising an admixture of (1) the reaction product derived by heating and reacting (a) an epihalohydrin and (b) at least one compound selected from the group consisting of dihydric phenols and the condensation product of a mononuclear monohydric alkyl phenol containing at least four carbon atoms in the alkyl group and an aldehyde selected from the group consisting of formaldehyde, acetaldehyde, chloraldehyde, butyraldehyde, and furfuraldehyde and (2) from 2% to 25% based on the weight of (1) of a curing catalyst comprised of an admixture of (a) from 1 to 2 mols of at least one polyborate ester selected from the group consisting of:

and wherein the valence bonds at each end are satisfied by at least one radical selected from the group consisting of a bivalent R radical and a monovalent R' radical wherein R is selected from the group consisting of polyhydric alcohols having two hydroxyl groups removed and R' is selected from the group consisting of monohydric alcohols and polyhydric alcohols having one hydroxyl group removed and (b) from 1 to 3 mols of a compound selected from the group consisting of organic amines and metallic amine chelates, said organic amines being selected from the group consisting of aliphatic primary, secondary, and tertiary amines, and said metallic amine chelates having the general formula:

wherein R and R' are selected from the group consisting of an aliphatic and aromatic organic group, and M is a metal selected from the group consisting of titanium, aluminum and silicon.

2. A composition of matter comprising an admixture of (1) the reaction product derived by heating and reacting (a) an epihalohydrin and (b) at least one compound selected from the group consisting of dihydric phenols and the condensation product of a mononuclear monohydric alkyl phenol containing at least four carbon atoms in the alkyl group and an aldehyde selected from the group consisting of formaldehyde, acetaldehyde, chloraldehyde, butyraldehyde, and furfuraldehyde and (2) from 10% to 15% based on the weight of (1) of a curing catalyst comprised of an admixture in a ratio of (a) from 1 to 2 mols of at least one polyborate ester selected from the group consisting of:

and wherein R is selected from the group consisting of polyhydric alcohols having two hydroxyl groups removed and R' is selected from the group consisting of monohydric alcohols and polyhydric alcohols having one hydroxyl group removed and (b) from 1 to 3 mols of a compound selected from the group consisting of organic amines and metallic amine chelates, said organic amines being selected from the group consisting of aliphatic primary, secondary and tertiary amines, and said metallic amine chelates having the general formula:

wherein R and R' are selected from the group consisting of an aliphatic and aromatic organic group, and M is a metal selected from the group consisting of titanium, aluminum and silicon.

3. A composition of matter comprising an admixture of (1) the reaction product derived by heating and reacting (a) an epihalohydrin and (b) at least one compound selected from the group consisting of dihydric phenols and the condensation product of a mononuclear monohydric alkyl phenol containing at least four carbon atoms in the alkyl group and an aldehyde selected from the group consisting of formaldehyde, acetaldehyde, chloraldehyde, butyraldehyde, and furfuraldehyde and (2) from 2% to 25% based on the weight of (1) of a curing catalyst comprised of a homogeneous admixture of (a) from 1 to 2 mols of trihexylene glycol biborate and (b) from 1 to 3 mols of triethanolamine titanate.

4. A composition comprising an admixture of (a) from 1 to 2 mols of at least one polyborate ester selected from the group consisting of:

and wherein R is selected from the group consisting of polyhydric alcohols having two hydroxyl groups removed and R' is selected from the group consisting of monohydric and polyhydric alcohols having one hydroxyl group removed and (b) from 1 to 3 mols of at least one compound selected from the group consisting of organic amines and metallic amine chelates, said organic amines being selected from the group consisting of aliphatic pri- mary, secondary and tertiary amines, and said metallic amine chelates having the general formula of:

wherein R and R' are selected from the group consisting of an aliphatic and aromatic group, and M is a metal selected from the group consisting of titanium, aluminum and silicon.

5. A curing catalyst comprising the product obtained on admixing and heating (a) from 1 to 2 mols of trihexylene glycol biborate and (b) from 1 to 3 mols of triethanolamine titanate.

6. An insulated electrical member comprising an electrical conductor and cured solid resinous insulation applied thereto, the resinous insulation comprising the hardened product derived by admixing and heating (1) the reaction product derived by heating and reacting (a) an epihalohydrin and (b) at least one compound selected from the group consisting of a dihydric phenol and the condensation product of a mononuclear monohydric alkyl phenol containing at least four carbon atoms in the alkyl group and an aldehyde selected from the group consisting of formaldehyde, acetaldehyde, chloraldehyde, butyraldehyde, and furfuraldehyde and (2) from 2% to 25% based on the weight of (1) of a curing catalyst comprised of an admixture of (a) from 1 to 2 mols of at least one polyborate ester selected from the group consisting of:

and wherein R is selected from the group consisting of polyhydric alcohols having two hydroxyl groups removed and R' is selected from the group consisting of monohydric alcohols and polyhydric alcohols having one hydroxyl group removed and (b) from 1 to 3 mols of a compound selected from the group consisting of organic amines and metallic amine chelates, said organic amines being selected from the group consisting of aliphatic primary, secondary and tertiary amines, and said metallic amine chelates having the general formula of:

wherein R and R' are selected from the group consisting of an aliphatic and aromatic organic group, and M is a metal selected from the group consisting of titanium, aluminum and silicon.

7. An insulated electrical member comprising an electrical conductor and cured solid resinous insulation applied thereto, the resinous insulation comprising the hardened product derived by admixing and heating (1) the reaction product derived by heating and reacting (a) an epihalohydrin and (b) at least one compound selected from the group consisting of a dihydric phenol and the condensation product of a mononuclear monohydric alkyl phenol containing at least four carbon atoms in the alkyl group and an aldehyde selected from the group consisting of formaldehyde, acetaldehyde, chloraldehyde, butyraldehyde, and furfuraldehyde and (2) from 10% to 15% based on the weight of (1) of a curing catalyst comprised of an admixture of (a) from 1 to 2 mols of at least one polyborate ester selected from the group consisting of:

and wherein R is selected from the group consisting of polyhydric alcohols having two hydroxyl groups removed and R' is selected from the group consisting of monohydric alcohols and polyhydric alcohols having one hydroxyl group removed and (b) from 1 to 3 mols of a compound selected from the group consisting of organic amines and metallic amine chelates, said organic amines being selected from the group consisting of aliphatic primary, secondary and tertiary amines, and said metallic amine chelates having the general formula of:

wherein R and R' are selected from the group consisting of an aliphatic and aromatic organic group, and M is a metal selected from the group consisting of titanium, aluminum and silicon.

8. An insulated electrical member comprising an electrical conductor and cured solid resinous insulation applied thereto, said resinous insulation comprising the hardened product derived by admixing and heating (1) the reaction product derived by heating and reacting (a) an epihalohydrin and (b) at least one compound selected from the group consisting of a dihydric phenol and the condensation product of a mononuclear monohydric alkyl phenol containing at least four carbon atoms in the alkyl group and an aldehyde selected from the group consisting of formaldehyde, acetaldehyde, chloraldehyde, butyraldehyde, and furfuraldehyde and (2) from 2% to 25% based on the weight of (1) of a curing catalyst comprised of a homogeneous admixture of (a) from 1 to 2 mols of trihexylene glycol biborate and (b) from 1 to 3 mols of triethanolamine titanate.

References Cited in the file of this patent
UNITED STATES PATENTS 2,741,548 Darling et al. ___________ Apr. 10, 1956
2,809,184 Langer _________________ Oct. 8, 1957